HENRY F. JENKS & THOMAS MARSH.
Improvement in Egg Beaters.
No. 115,862.
Patented June 13, 1871.
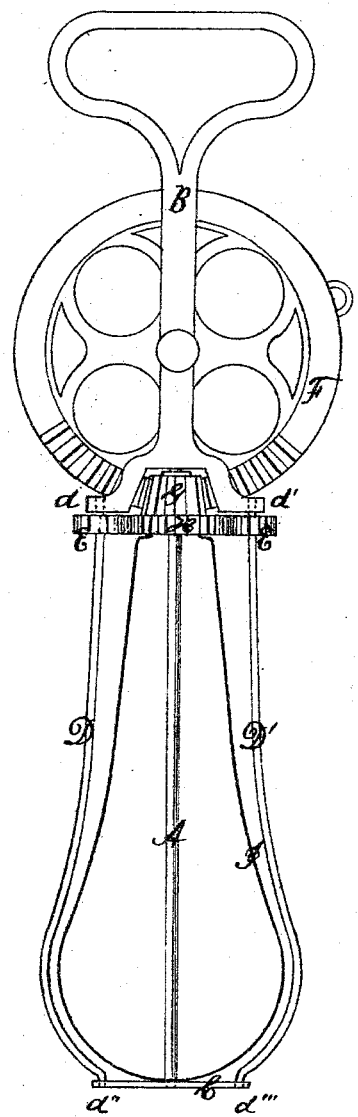
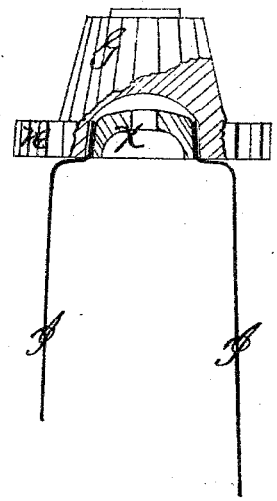

115,862

UNITED STATES PATENT OFFICE.

HENRY F. JENKS AND THOMAS MARSH, OF PAWTUCKET, RHODE ISLAND.

IMPROVEMENT IN EGG-BEATERS.

Specification forming part of Letters Patent No. 115,862, dated June 13, 1871.

We, HENRY F. JENKS and THOMAS MARSH, of Pawtucket, in the county of Providence and State of Rhode Island, have invented certain Improvements in Egg-Beaters; and we do hereby declare that the following specification, taken in connection with the drawing making a part of the same, is a full, clear, and exact description thereof.

The nature of our invention consists in the combination and arrangement of parts, as hereinafter more fully described.

Figure 1 is a side elevation of our invention; and Fig. 2 is a section of one of the gears, showing how the securing-piece holds the ends of the beater.

The ends of the beater I, Fig. 2, are secured to the gear H by being held between the sides of the securing-piece X (which piece X is constructed in any desired form) and the sides of the hole in said gear. The handle B, spindle A, foot C, upper and lower bearings $d\ d'\ d''\ d'''$ of the eccentric beaters D D', Fig. 1, are all secured together. The pinion G, gear H, beater I, piece X, Fig. 2, are also secured together and made to revolve around the stationary spindle A, Fig. 1; and while the pinion G and gear H, to which is attached the beater I, Fig. 1, are being revolved around said spindle A by means of the segment-toothed wheel F, which drives said pinion G, the two pinions E E' (each of which have half the number of teeth that there are on the gear H) being connected to said gear H and attached to the eccentric beaters D D', (which are made in any desired eccentric form,) are also made to revolve on their bearings $d\ d'\ d''\ d'''$ by the same means. Thus, by this arrangement of gears and beaters, there is produced at the same time one circular motion of the beater I and two motions of each of the eccentric beaters D D'.

What we claim as our invention is—

The arrangement and combination of gears G H E E', piece X, beater I, and eccentric beaters D D', when operating in the manner and for the purpose substantially as described.

HENRY F. JENKS.
THOMAS MARSH.

Witnesses:
    JOHN P. GREGORY,
    JOHN H. CROWELL.